United States Patent [19]

Yamaguchi

[11] Patent Number: 5,790,204
[45] Date of Patent: Aug. 4, 1998

[54] TELEVISION RECEIVING SET HAVING MULTIPLEXED TEXT DECODER

[75] Inventor: Koichi Yamaguchi, Fukaya, Japan

[73] Assignee: Kabushiki Kaisha Toshiba, Kawasaki, Japan

[21] Appl. No.: 721,625

[22] Filed: Sep. 26, 1996

[30] Foreign Application Priority Data

Sep. 26, 1995 [JP] Japan .................................. 7-247430

[51] Int. Cl.⁶ .................................................. H04N 5/445
[52] U.S. Cl. ........................ 348/564; 348/565; 348/588; 348/569; 348/589
[58] Field of Search ............................ 348/563, 564, 348/565, 568, 569, 588, 589, 600; H04N 5/445, 5/45

[56] References Cited

U.S. PATENT DOCUMENTS

| | | | |
|---|---|---|---|
| 5,363,143 | 11/1994 | Duffield | 348/564 |
| 5,420,642 | 5/1995 | Baek | 348/565 |
| 5,610,664 | 3/1997 | Bobert | 348/564 |

FOREIGN PATENT DOCUMENTS

| | | |
|---|---|---|
| 57-73579 | 5/1982 | Japan . |
| 58-21981 | 2/1983 | Japan . |
| 2-190088 | 7/1990 | Japan . |

*Primary Examiner*—Sherrie Hsia
*Attorney, Agent, or Firm*—Cushman Darby & Cushman IP Group of Pillsbury Madison & Sutro, LLP

[57] ABSTRACT

A television set having more than one tuner and a multi-image displaying feature which controls the location of images on the television screen such that the characters and graphics transmitted in the form of teletext/data transmission signals or supplementary programs are displayed in predetermined locations of the screen to avoid confusion with the conventional television program. The first video signal from a first video tuner is fed through a video processing circuit to a teletext/data transmission decoder, which decodes the transmission or supplementary program. The data transmission or supplementary program is synthesized with the video signal to display the conventional television program with the data transmission or supplementary program text or graphics, which are placed at a predetermined location on the display screen. The second video signal from a second video tuner is fed through a video processing circuit to a data transmission or supplementary program detector. Upon detecting a data transmission signal or supplementary program, the data transmission detector alerts the main controller. If the seconds video signal contains a data transmission signal or supplementary program, whereas the first video signal does not, the main controller tunes the first tuner to receive the supplementary program. With this arrangement, the characters and graphics of supplementary programs are automatically displayed on a predetermined location on the television screen to avoid confusion with the conventional television program.

6 Claims, 7 Drawing Sheets

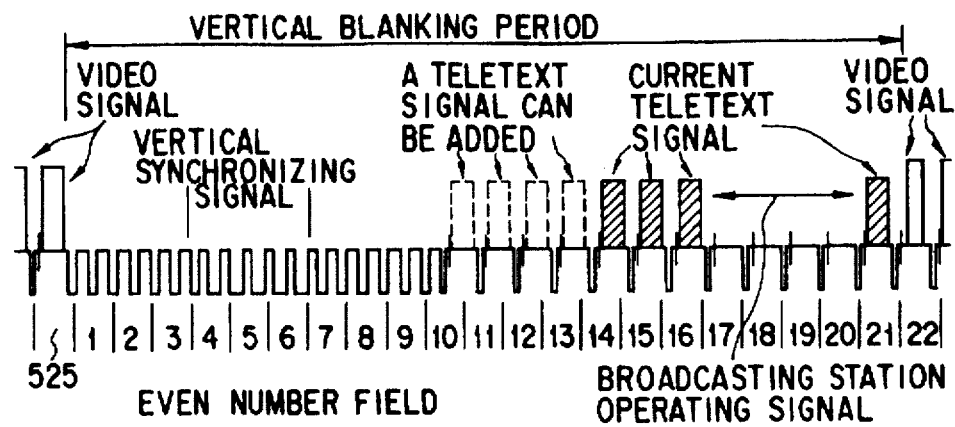
F I G. 2A
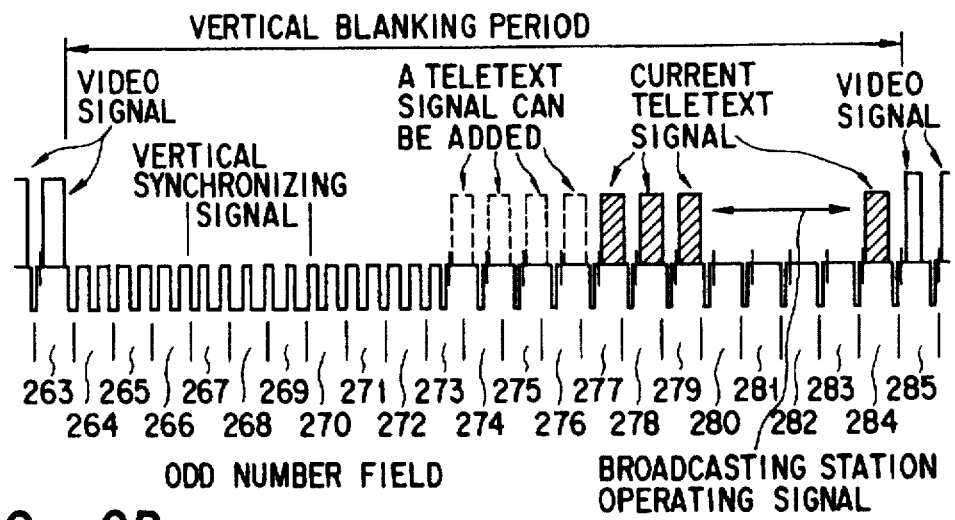
F I G. 2B
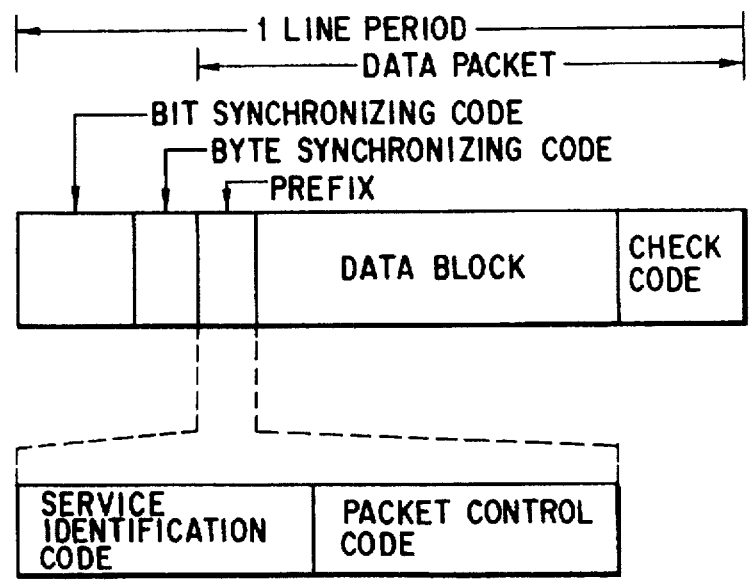
F I G. 3

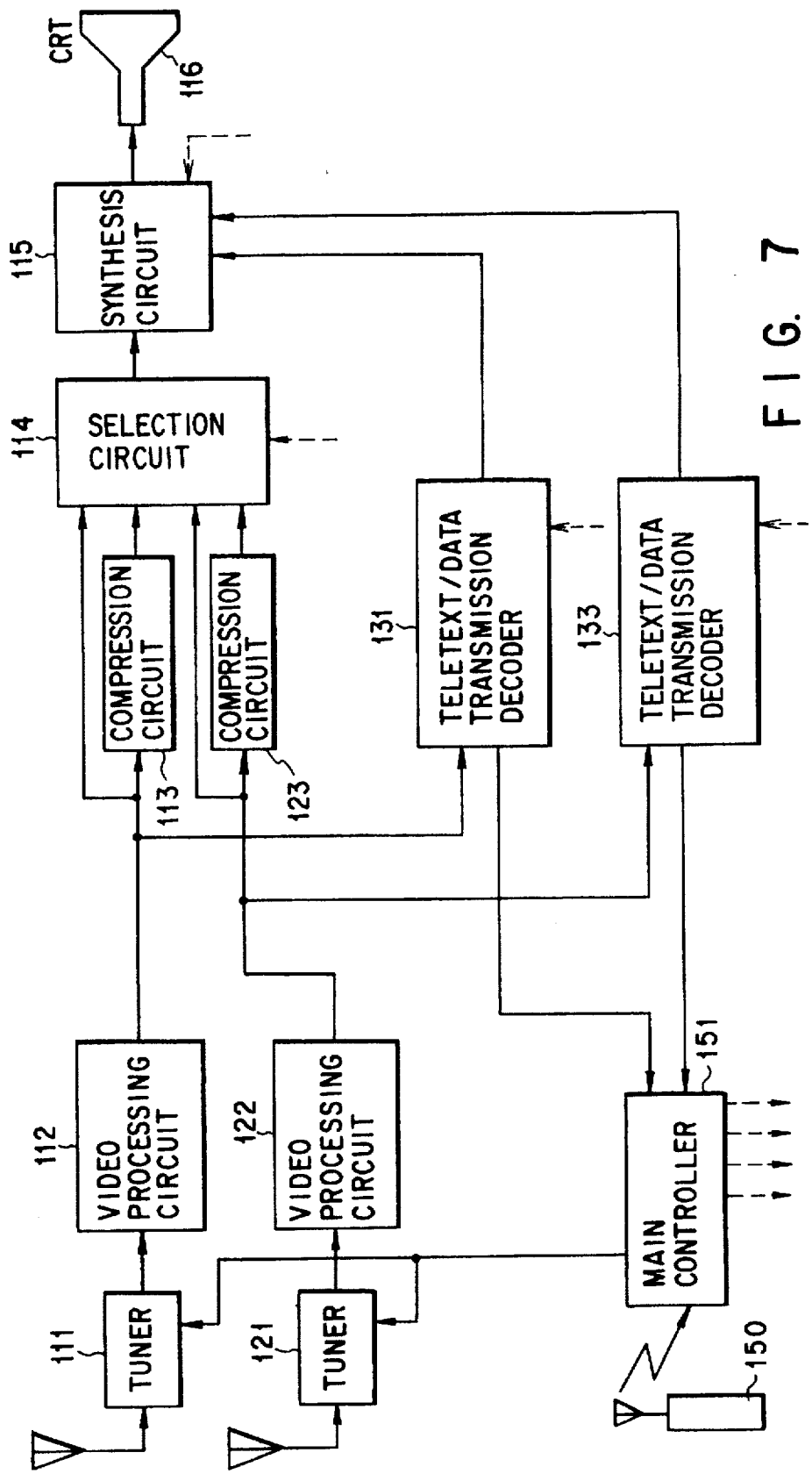

TELEVISION RECEIVING SET HAVING MULTIPLEXED TEXT DECODER

BACKGROUND OF THE INVENTION

1. Field of the Invention

This invention relates to a television receiving set having a multiplexed text decoder and, more generally, it relates to a technology of effectively assisting the viewer, when viewing multiple video signals on one display, where each video signal may also include data transmission signals containing characters and graphics, in understanding to which video signal the data transmission signal corresponds.

2. Description of the Invention

The multiplexed text broadcasting, or teletext, is a currently available television broadcasting service for transmitting signals for characters and graphics along with ordinary television signals through a single transmission channel. It is used currently for programs of various categories including news, weather forecast, traffic information, tourism information and television shopping. In some programs, teletext is used for television polling.

The teletext is unilateral in the sense that information is offered only from the broadcasting station to the viewers. In telephone shopping programs where the program provider transmits shopping information utilizing teletext, the viewer notes the code of the commodity he or she wants to buy, the telephone number of the mail-order firm and other pieces of information displayed on the screen and subsequently dials the telephone number for ordering by referring to note. In the television polling programs television polling, viewers will also note the telephone numbers to be used for the poll and subsequently dial one of the telephone numbers by referring to the note. In either case, problems arises wherein viewers may dial a wrong number by incorrectly keying in the number by noting or writing down the wrong number or for some other reason.

Thus, firstly, since the teletext is unilateral in the sense that information is offered only from the broadcasting station, whose agents then wait for calls from viewers, it response time is undesirably extended. Secondly, the viewing and telephone ordering procedure described above intrinsically involves a certain level of probability that the viewer will make wrong calls.

In order to bypass the above identified problems, a technique is proposed in which the broadcasting station transmits computer program data to each television receiving set having the teletext and computer features. Such a television set with the computerized feature would comprise means for receiving and storing in memory the transmitted data. The computerized feature would also comprise means of communication to the telephone network, such as a modem. In this improved technique, the viewer who desires to order something advertised on television, or to respond to a poll, will use the remote control or some other means to key in the order or other data. The computer automatically dials the transmitted telephone number and correctly makes the order or provides the information.

With such an arrangement, the probability of dialing a wrong number is reduced to nil and the response time is significantly curtailed.

In the following description, a supplementary program refers to the program transmitted from the television station which contains the computer program data and supplementary data which comprises characters and graphics explaining how to use the system. The computer program will be referred to as script.

Since most of the existing circuit block (teletext transmission decoder) for receiving and processing teletext programs can be shared by the circuit block (supplementary data transmission decoder) for receiving and processing supplementary programs, the combination of a teletext transmission decoder and a supplementary data transmission decoder can be dimensionally reduced when they are designed in the form of a single circuit block that is operated selectively either in a teletext program mode or in a supplementary program mode.

Television receiving sets having an image memory and a multi-image displaying feature are also currently available. Some television receiving sets have the feature of splitting the screen into two sections and simultaneously displaying two television images received through two different television channels on the respective sections. A supplementary program is most often displayed on a television's only showing one television channel.

However, when the screen of a television receiving set having a multi-image displaying feature is divided into two sections to show two different channels and a supplementary program is laid on the image of one of the two sections, the viewer may be confused in discriminating the supplementary program from the regular programs on the screen. Furthermore, if the two television channels display home shopping programs or programs in which ordering or polling may be accomplished and one of the programs utilizes the supplemental programs disclosed herein, the viewer may be confused as to which television channel the supplemental program is associated with. This could cause the seller to lose customers. Additionally, when the two sections simultaneously show a weather forecast, the viewer may be further confused in discriminating between the weather forecast of the supplementary program and that of the proper program.

SUMMARY OF THE INVENTION

As described above, television receiving sets having a multi-image displaying feature and capable of displaying two or more television images received through different channels on respective sections of the screen are currently available and, when a supplementary program is laid on the image of one of the sections of the screen, the viewer may be confused in discriminating the supplementary program from the programs on the screen.

Therefore, the object of the present invention is to provide a television receiving set having a multi-image displaying feature and provided with a teletext decoder capable of automatically assigning a specific section of the screen for displaying characters and graphics of supplementary programs so that the viewer may not be confused in discriminating the current supplementary program from the programs on the screen.

According to the invention, there is provided a television receiving set having a multi-image displaying feature and comprising a means for controlling the image displaying operation of the television receiving set in such a way that the characters and graphics transmitted in the form of teletext signals and/or data transmission signals are always displayed on the right or left section of the screen, if the screen is divided into two sections in order to avoid any confusion on the part of the viewer.

More specifically, there is provided a television receiving set comprising a reception means including first and second tuners and capable of simultaneously receiving the television signals coming through two different channels, a first processing means for processing the signal received by the first tuner into a first video signal for display, a second processing means for processing the signal received by the second tuner into a second video signal for display, a display processing means for displaying the first video signal from the first processing means on either a left section or a right section of the screen of a display unit and the second video signal from the second processing means on the other section of the screen of the display unit, a decoding/synthesizing means for decoding a data signal contained in the first video signal from the first processing means to produce a restored original signal and synthetically combining the restored signal with either the first video signal or the second video signal to be displayed on a section of the screen of the display unit specified by the display processing means, a detection means for detecting if the second video signal from the second processing means contains a data signal and a control means for switching the first tuner and the second tuner when the detected output of the decoding/synthesizing means indicates that the first video signal does not contain any data signal and the detected output of the detection means indicates that the second video signal contains a data signal.

With the above arrangement, the characters and graphics of supplementary programs are always displayed automatically on a predetermined section of the screen so that the viewer may not be mistaken in accessing the supplementary program. An additional advantage of this arrangement is if the supplemental program is sent in coordination with the video signal upon which it is carried, when viewing two television channels simultaneously, there will be no confusion as to which television channel the supplemental program is associated with.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 2A and 2B are graphs illustrating a signaling system for transmitting teletext and data transmission signals to which this invention is applicable, where FIG. 2A illustrates even number fields of a television signal and FIG. 2B illustrates odd number fields;

FIG. 3 is a schematic illustration of a data packet of teletext and data transmission signals to which this invention is applicable;

FIG. 7 is a block diagram of another embodiment of television receiving set comprising a teletext decoder according to the invention.

DESCRIPTION OF THE PREFERRED EMBODIMENTS

Now, the present invention will be described by referring to the accompanying drawings that illustrate preferred embodiments of the invention.

Figure 1:
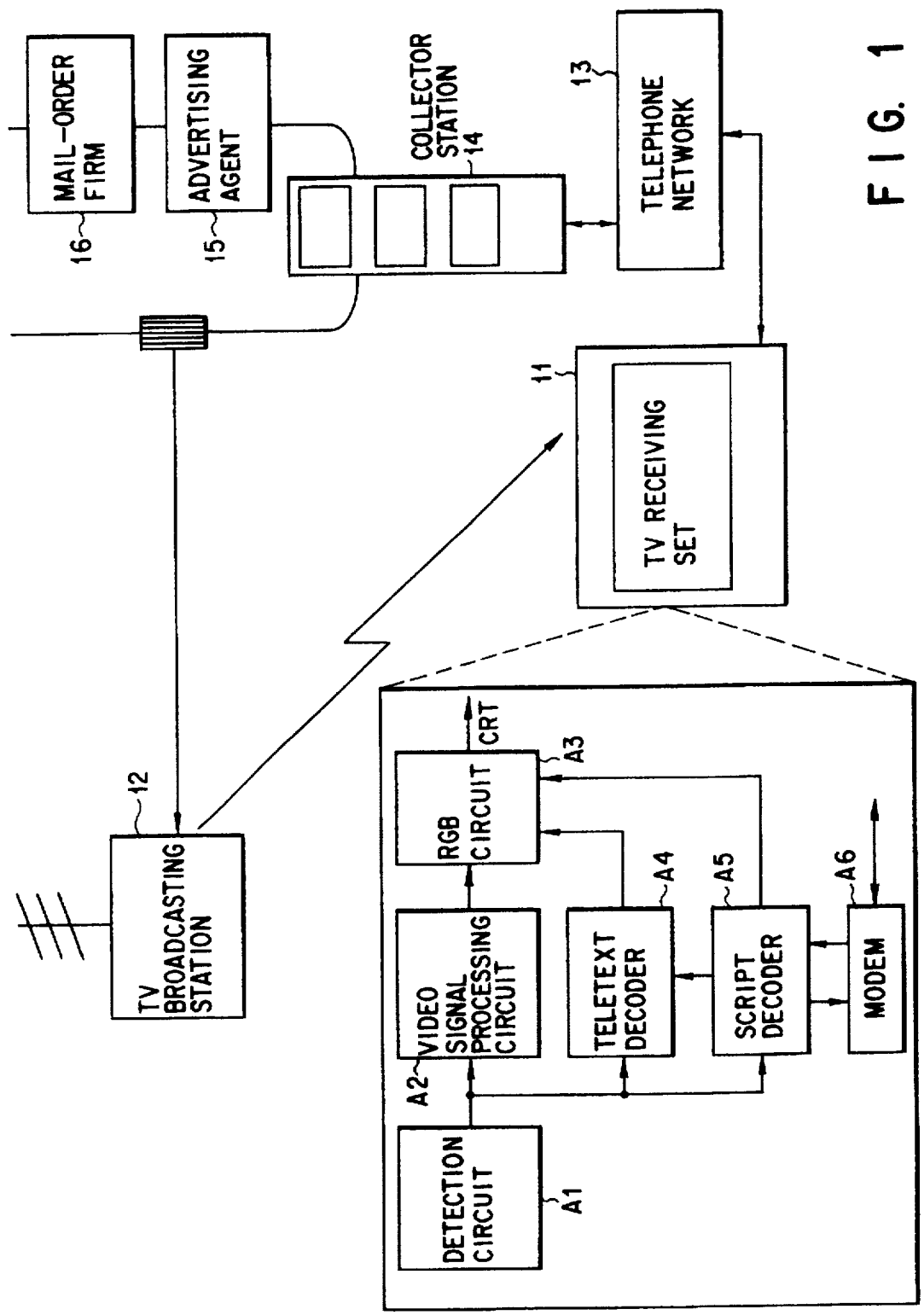
FIG. 1 is a block diagram of a transmission/reception system for teletext and data transmission signals realized by applying this invention.

FIG. 1 is a block diagram of a bidirectional telecommunications system realized by utilizing a television (TV) broadcasting network and applying this invention. This system utilizes the existing teletext service feature of a television broadcasting network and a telephone network. An expanded upload data transmission service is realized by combining a television broadcasting network that is unidirectional and a telephone network to bring forth a bidirectional service system. More specifically, this system is realized by expanding the existing teletext service feature of a television broadcasting network by means of software. Thus, the proper television broadcasting service and teletext services are not affected if a script is added to a TV program. Nor the proper functions of a TV receiving set will be affected by using an apparatus according to the invention with it.

The system of FIG. 1 is realized by establishing a network comprising a TV receiving set 11, a TV broadcasting station 12, a telephone network 13 and a collector station 14. The TV broadcasting station 12 transmits a script (computer program) including a supplementary program with a proper television program to realize a bidirectional service for the proper television program. Alternatively, the TV broadcasting station 12 may transmit the computer program repeatedly as an independent program within a predetermined time slot. A script is a sort of application program that defines the procedure for establishing a bidirectional telecommunications system. It is transmitted in vertical blanking intervals of TV signals.

The script is stored in a memory of the TV receiving set 11 for receiving TV signals and typically executed by a program executing device (script decoder) incorporated in said TV receiving set 11. The script decoder then displays on the TV screen a symbol mark (e.g., letter "i") indicating that the current program is accompanied by a supplementary program to notify the viewer about it. By keying in the appropriate command, the viewer executes the script to display supplementary data for the program.

The means for displaying a symbol mark (supplementary program mark) is unique to the system and will be described hereinafter along with its operation.

The responding operation of the viewer may be completed only within the TV receiving set 11 or the response of the viewer may be transmitted to the TV broadcasting station 12, advertising agent 15 or mail-order firm 16 by way of a local computer system (collector station 14) and the telephone network 13. The TV broadcasting station 12 can receive the responses from the viewers and reflect them on the current program on a real time basis. Alternatively, it may pick up desired data from the collector station 14 by way of the telephone network 13.

The TV receiving set 11 is provided with a script decoder A5 and a modem A6 for bidirectional telecommunications in addition to an ordinary TV reception circuit including a detection circuit A1, a video signal processing circuit A2, an RGB circuit A3 and a teletext decoder A4. The script decoder A5 picks up scripts from the TV signals being transmitted from the TV broadcasting station 12 and execute them to realize bidirectional telecommunications.

The viewer operates the TV remote control to respond the program and send upload data. As the viewer keys in his or her response, the modem A6 contained in the TV receiving set 11 automatically dials the specified telephone number to connect itself to the collector station 14 by way of the telephone network 13 so that consequently the response of the viewer is conveyed to the collector station 14. The upload data (response data) are transmitted instantly if the program wants them on a real time basis. If not, they may be transmitted during the night when the lines are less busy.

The viewer does not have to dial the specified telephone number because the modem A6 added to the TV receiving set 11 has an automatic dialing feature. The specified telephone number is contained in the script transmitted to the viewer from the TV broadcasting station 12 for each supplementary program. More than one telephone number may be contained in a script so that the viewer may select an appropriate number.

The script decoder A5 is a processor that executes computer programs one at a time. However, since the teletext decoder A4 also contains a processor, the script decoder A5 is realized in reality by expanding the function of the teletext decoder A4 by way of software. In other words, the script decoder A5 is comprised of the teletext decoder A4 and a program ROM (not shown) and hence shares many circuits with the teletext decoder A4.

When the TV broadcasting station 12 transmits a program that viewers can participate in by telephone, it typically inserts a set of supplementary program data including a script into the TV signals including video and audio signals of the program. A program production system for producing a set of data for a supplementary program including a script and inserting them into the proper program can be prepared by using a personal computer and a multiplexing device.

The TV broadcasting station 12 transmits a supplementary program added to the proper program by inserting it into the channel of the latter. The computer program to be added to the proper program may be produced by the TV broadcasting station, the advertising agent 15 of the program or a third party such as a mail-order firm 16. The computer program produced by the TV broadcasting station may be prepared in advance or on a real time adhoc basis as in the case of broadcasting a live sports event.

A script typically has a configuration as described below.

A script is produced by the TV broadcasting station 12 and signals for it are transmitted with ordinary video and audio signals. A script is realized as a set of objects as listed below.

(1) background/displaying materials
(2) operational buttons
(3) a sequence of characters
(4) images Each of the objects may have a complementary procedure typically described by using an extended BASIC language, which includes control instructions for bidirectional telecommunications in addition to the ordinary BASIC language.

As a script is executed, firstly, the background of the scene and the elements that constitute the scene such as operational buttons are displayed. When the viewer selects one of the buttons and operates it, the program that corresponds to the button is started.

A processing procedure is registered in advance in the collector station 14 and the collected data may be distributed to the TV broadcasting station 12, the advertising agent 15, the program sponsor and the mail-order firm 16.

The following three types of bidirectional program can be realized by the above described bidirectional telecommunications system.

(1) supplementary data program capable of:
  selecting and displaying additional information on the advertised commodities,
  selecting and displaying data for a live sports event,
  displaying a program summary,
  storing cooking recipes and displaying them later,
  commenting to the answers to questions posed by children in an educational program and
  responding to the answers from the viewers of a quiz show, (2) response feedback program (using a collector station 14) capable of:
  carrying out a TV poll on social, economic and social issues,
  carrying out a TV poll on sports events and
  displaying statistics on correct answers and carrying out a tournament of viewers and (3) program having transactions (using a collector station 14) capable of:
  receiving orders at a server (collector station 14) in a program for TV shopping,
  receiving requests for catalogs at a server (collector station 14) shown in TV ads and
  transmitting program viewing data for a survey on program viewing rates to a server (collector station 14) under the condition that the viewers consent to the survey.

FIGS. 2A and 2B illustrate a hybrid signaling system for transmitting teletext data and character transmission data to which this invention is applicable. More specifically, character transmission data are transmitted in the 14th H (the 277th H) through 16th H (the 279th H) and the 21th H (the 284th H) of a vertical blanking interval. Since the vertical blanking interval still has a space for data multiplexing, the 10th H (the 273th H) through the 13th H (the 276H) may be used for multiplexing the signals for a script.

The signals for a script may be multiplexed at positions different from those of the signals for the current character multiplexing or at the positions of the signals for the current character multiplexing on a time division basis. Alternatively, the signals for character transmission data may be transmitted through one of the sub-channels for audio multiplexing. In the latter case, the TV receiving set 11 picks up data from an FM reception section (not shown).

FIG. 3 schematically illustrates the configuration of a data packet of teletext and data transmission signals to which this invention is applicable and which are transmitted in a line period. A bit synchronizing code and a bit synchronizing code are arranged in front of the data packet. The data packet comprises a prefix, a data block and a check code. The prefix includes a service identification code and a packet control code. The service identification code is used to notify that the signals for a supplementary program have arrived.

Figure 4:
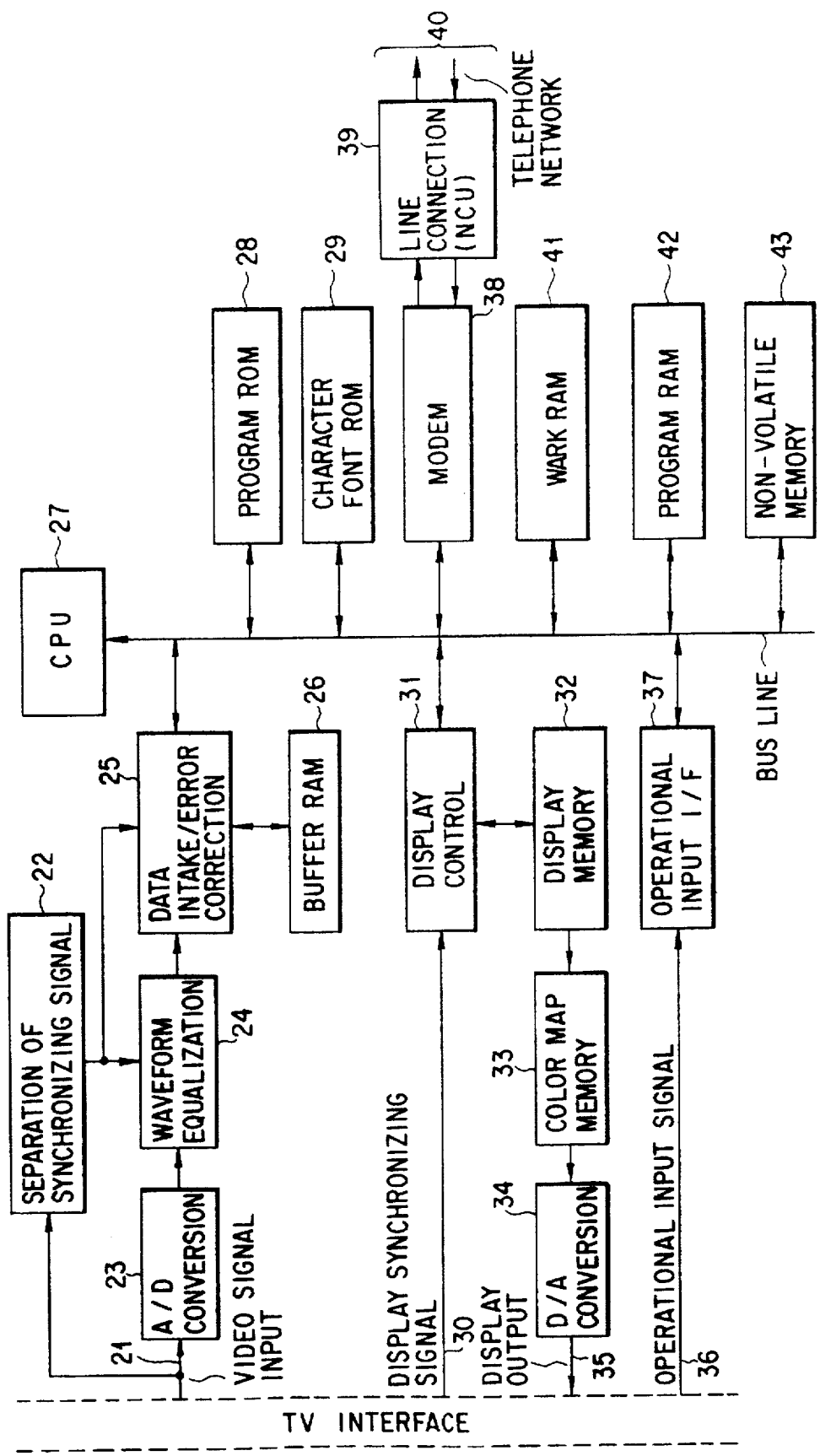
FIG. 4 is a block diagram of a teletext/data transmission decoder that can be used for an apparatus according to the invention.

FIG. 4 is a block diagram of a teletext/data transmission decoder that can be used in a TV receiving set 11 according to the invention. It includes a bidirectional transmission device, a teletext decoder and a script decoder.

Video signals of a selected transmission channel are fed to a synchronizing signal separating section 22 and an A/D converter 23 through an input terminal 21. A signal for data for bidirectional digital telecommunications are multiplexed on a video signal in vertical blanking intervals. The data digitized by the A/D converter 23 are processed for waveform equalization by a waveform equalizing section 24 and then fed to a data intake/error correcting section 25.

The waveform equalizing section is designed to compensate the degradation of the digitized video signal that takes place in the transmission channel and separates the digital transmission signal multiplexed on the video signal. Then, it produces the multiplexing data and the clock contained in the separated signal. The data intake/error correcting section 25 takes the multiplexing data into a buffer RAM 26 in synchronism with the clock by a unit of 8 bits.

CPU 27 operates on the basis of the fixed program stored in a program ROM 28. Character font ROM 29 stores character fonts to be used for displaying characters so that the CPU 27 addresses the desired characters and reads out character data for the ROM 29 corresponding to the addressed characters.

Input terminal 30 is fed with a synchronizing signal for synchronizing the signal of the supplementary program with that of the proper program of the TV receiving set. The synchronizing signal is then fed to a display control section 31. The display control section 31 reads out the data stored in display memory 32 in synchronism with the image being displayed on the screen of the TV receiving set and carries out an operation of writing the data to be displayed in the display memory 32 according to a write instruction from the CPU 27.

The data read out of the display memory 32 are then fed to color map memory 33. The color map memory 33 receives the address of the data to be displayed and produces the data for the levels of the RGB color signal corresponding to the address. The level data are then converted into an analog RGB signal by D/A converter 34 and fed out through the output terminal 35 of the circuit as a display signal.

The display signal is then synthetically combined with a TV video signal and displayed on the display screen (not shown) as an image obtained by superimposing a graphic on the image of the proper program. Depending on the interface of the display apparatus, the D/A converter 34 may be omitted and the RGB signal produced by the color map memory 33 may be directly produced as an output signal.

Input terminal 36 receives the operation signal keyed in by the viewer by means of the TV remote control. The operation signal is then taken into and analyzed by the CPU 27 by way of an operational input interface (I/F) 37.

Modem 38 comprises a modulator and a demodulator and operates as a telecommunications control section, which is connected to a telephone network 40 by way of a line connecting section 39. The line connecting section 39 operates to connect the circuit to and disconnect it from the telephone network 40 under the control of the CPU 27.

The CPU 27 is connected to the functional blocks including the data intake/error correcting section 25, the program ROM 28, the character font ROM 29, the operation input I/F 37, the display control section 31 and the modem 38 by way of a bus line. The bus line is also connected to a work RAM 41, a program RAM 42, a non-volatile memory 43 and other devices.

The program RAM 42 is a memory for storing the script (computer program) transmitted from the TV broadcasting station, which can be executed according to the input operation of the viewer by interpreting the script by means of the interpreter of the fixed program stored in ROM 28.

The non-volatile memory 43 stores an identification number (ID) specific to the receiving terminal (decoder), which is typically used for transmitting order data to the collector station 14 for television shopping. The collector station 14 can identify the order by recognizing the ID.

The above described circuit is used for teletext programs. As the viewer specifies a teletext program by operating the TV remote control, the CPU 27 comes under the control of the program stored in the program ROM 28 for teletext programs. Then, the transmitted character data are converted into display data by the character font ROM 29 and stored in the display memory 32 by way of the display control section 31.

Figure 5:
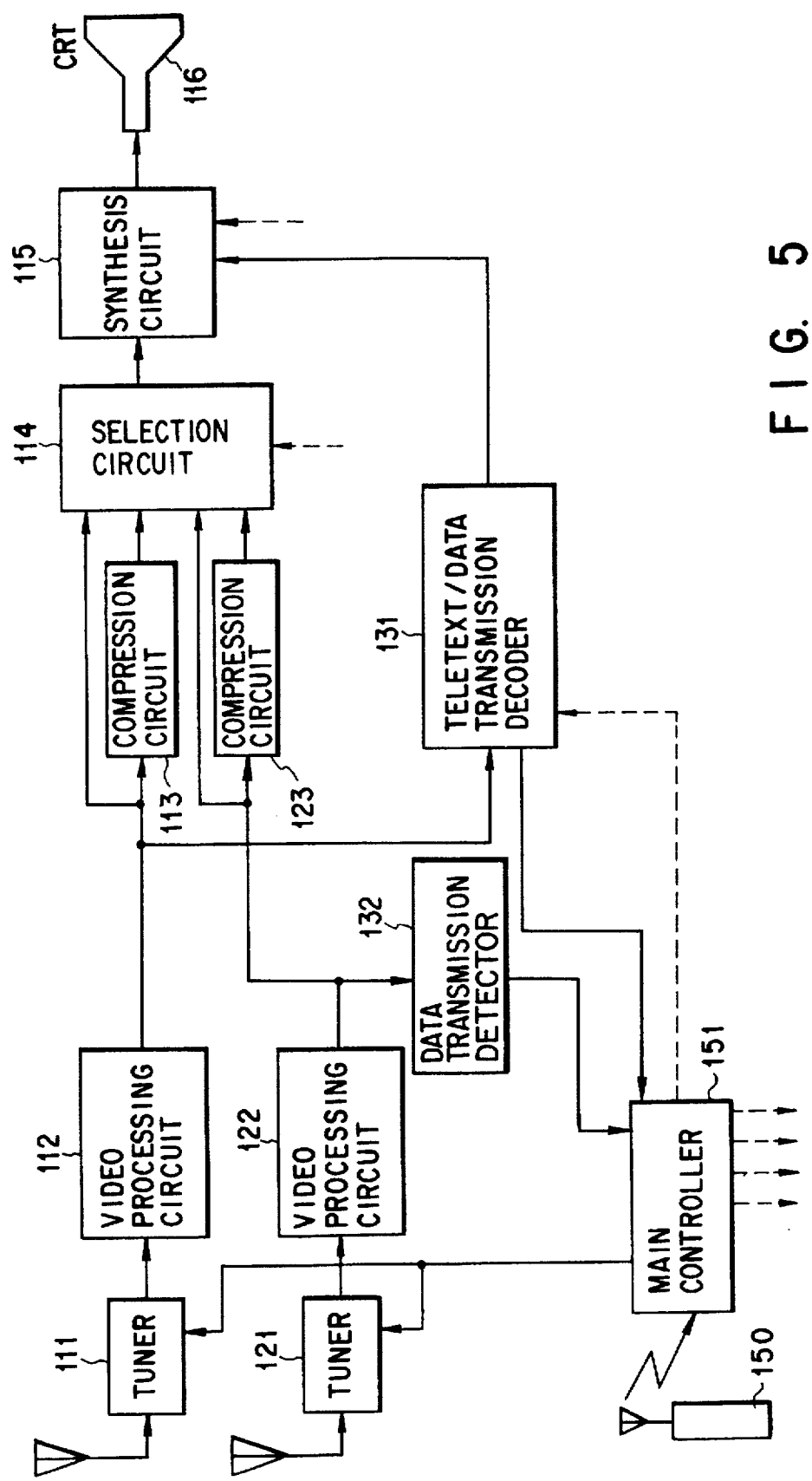
FIG. 5 is a block diagram of an embodiment of television receiving set comprising a teletext decoder according to the invention.

FIG. 5 is a block diagram of an embodiment of television receiving set according to the invention.

Referring to FIG. 5, the television signal received by tuner 111 is fed to a video processing circuit 112 and processed for detection and gamma correction. The video signal produced by the video processing circuit 112 is, if necessary, processed for image compression by a display image processing section 113. Selection circuit 114 can selectively provides the compressed signal or the uncompressed video signal coming from the video processing circuit 112 according to a control signal. The electrical connection from the Main Controller to the selection circuit is represented by the intermittent-line arrows extending from the Main Controller 151 and the corresponding intermittent-line arrows pointing into the selection circuit 114. The selected video signal is then fed to a synthesizing circuit 115.

The synthesizing circuit 115 synthetically combines the video signal from the selection circuit 114 with the signal coming from teletext/data transmission decoder 131. The output of the synthesizing circuit 115 is then fed to a display unit (CRT) 116 which is comprised of a cathode ray tube. The synthesizing circuit 115 is controlled the Main Controller as illustrated by the intermittent-line arrows extending from the Main Controller 151 and the corresponding intermittent-line arrow pointing into the synthesizing circuit 115.

On the other hand, the teletext/data transmission decoder 131 has a configuration as described above and operates to detect teletext signals and signals of a supplementary program contained in the output video signals of the video processing circuit 112.

The television receiving set additionally comprises another tuner 121. The television signal received by the tuner 121 is fed to another video processing circuit 122 and processed for detection and gamma correction. The video signal produced by the video processing circuit 122 is, if necessary, processed for image compression by a display image processing section 123.

The selection circuit 114 can selectively provide the compressed signal or the uncompressed video signal coming from the video processing circuit 122 according to a control signal as illustrated by the intermittent-line arrows. The selected video signal is then fed to a synthesizing circuit 115.

The video signal produced by said video processing circuit 122 is also fed to a data transmission detector 132. The detection signal of the data transmission detector 132 is then fed to a main controller 151. The main controller 151 also receives a detection signal from the teletext/data transmission decoder 131.

A television receiving set having a configuration as described above operates in a manner as described below. Note that the display unit 116 may have a screen with an aspect ratio of 16:9 so that it is adapted to wide screen images.

When the viewer specifies an A-channel display mode (for displaying only images for the signals received by tuner 111) by means of the remote control unit 150, the selection circuit 114 directly selects the output of the video processing circuit 112 and feeds it to the synthesizing circuit 115. In the A-channel display mode, teletext and/or data transmission signals may be added to the received signals. More specifically, the output of the teletext/data transmission decoder 131 is synthetically combined with the output video signal of the synthesizing circuit 115 by the latter to display characters and graphics including supplementary data.

If, on the other hand, the viewer operates the remote control unit 150 to specify a B-channel display mode (for displaying only images for the signals received by tuner 121) by controlling main controller 151, the selection circuit 114 directly selects the output of the video processing circuit 122 and feeds it to the synthesizing circuit 115.

If, finally, the viewer specifies both the A and B-channel display modes (for displaying images of the signals received by the tuners 111 and 121), the selection circuit 114 alternately selects a horizontal line of the compressed image produced by the compression circuits 113 or 123 at the horizontal middle point of the screen. In other words, two images are simultaneously displayed on the screen of the display unit 116.

Figure 6A:
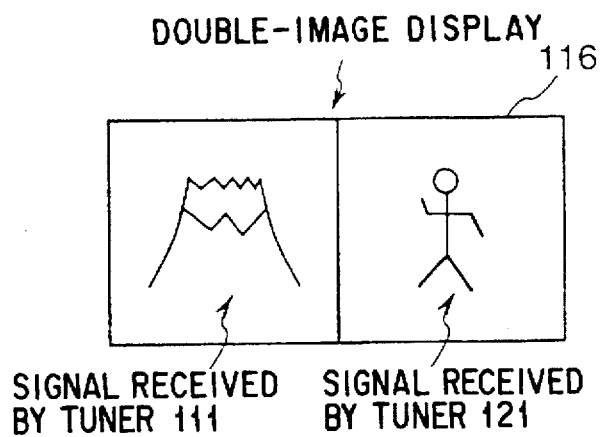
FIGS. 6A through 6E are views that can be displayed by the television receiving set of FIG. 5.

FIG. 6A illustrates two images that can be simultaneously displayed on the screen according to this invention. There, the image for the signal received by the tuner 111 is displayed on the left side of the screen, whereas the image for the signal received by the tuner 121 is displayed on the right side of the screen.

Figure 6D:
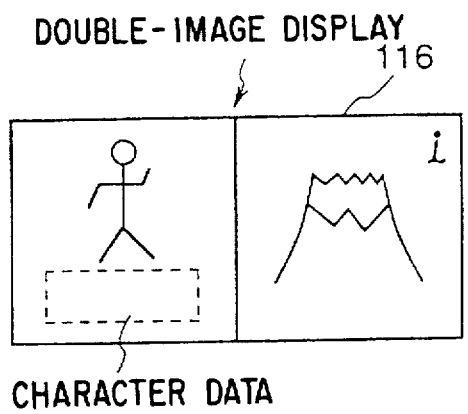
Figure 6B:
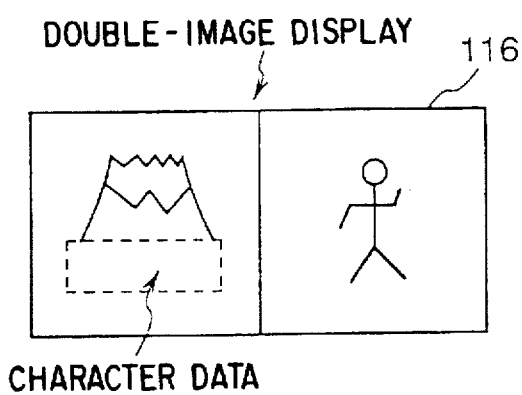

Now, assume that a data transmission is started through the A-channel and the viewer selects the mode of operation for receiving supplementary programs. Then, supplementary data will be shown on the proper program of the A-channel as shown in FIG. 6B.

When the data transmission is terminated and if another data transmission is started through the B-channel, the main controller 151 recognizes that the data transmission detector 132 is providing a detection signal whereas the teletext/data transmission decoder 131 does not provide any detection signal.

Under this condition, the main controller 151 so controls the tuners 111 and 121 that the tuner 111 is connected to the channel through which a data transmission is currently going on whereas the tuner 121 is connected to the channel through which a data transmission was going on until some time ago. As a result, characters and graphics of supplementary programs are always displayed on the left side section of the screen as shown in FIG. 6C (in the above instance).

Thus, with a television receiving set having a configuration as described above, the main controller 151 operates in such a way that the tuner 111 is always connected to the channel through which a teletext/data transmission is currently going on. Therefore, the viewer can respond to any television polls or the like by simply by looking at the left portion of the screen thus insuring that the viewer is never confused.

While a data transmission takes place only through one of the two channels in the above instance, two data transmissions may take place concurrently through respective channels. If such is the case, a mark representing a supplementary program, e.g., mark "i", is displayed on the right side section of the screen as shown in FIG. 6D. Under this condition, the main controller 151 transmits a control signal to the teletext/data transmission decoder 131 and causes the latter to produce a signal for mark "i" at the timing of displaying the program of the right side section of the screen.

Figure 6E:
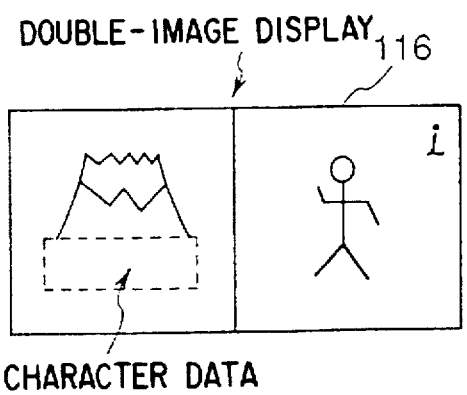
Figure 6C:
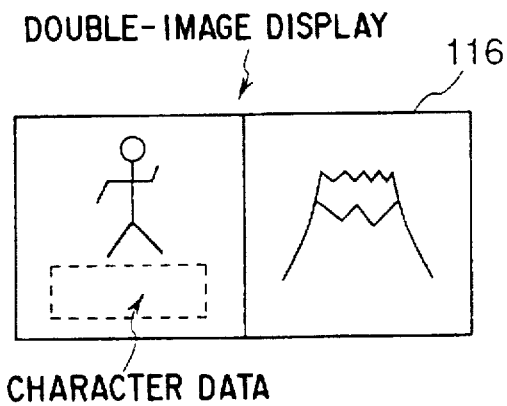

If the viewer switches the images of the two sections of the screen, supplementary data such as characters and graphics are displayed only on the left side section of the screen whereas mark "i" is displayed on the right side section of the screen as shown in FIG. 6E. Thus, the viewer can only respond to the image of the left side section of the screen.

FIG. 7 is a block diagram of another embodiment comprising a teletext decoder according to the invention. In this embodiment, the data transmission detector 132 of the embodiment of FIG. 5 is replaced by a teletext/data transmission decoder 133.

More specifically, the video signal produced by the video processing circuit 122 is also fed to the teletext/data transmission decoder 133, which produces decoded data in the form of characters and graphics to the synthesizing circuit 115.

This embodiment operates basically same as the first embodiment but, since teletext/data transmission decoders 131 and 133 are provided respectively for the two channels, the operation of switching the connection between the tuners 111 and 121 and the transmission channels is not required and only the timing of the displaying operation must to be controlled. When a data transmission that has being conducted only on the side of the teletext/data transmission decoder 131 is over and another data transmission starts only on the side of the teletext/data transmission decoder 133, the screen is switched from the status of FIG. 6B to that of FIG. 6C.

With this embodiment again, characters and graphics are displayed only on the left side section of the screen. If two data transmissions take place concurrently through respective channels, a mark representing a supplementary program, e.g., mark "i", is displayed on the right side section of the screen as shown in FIGS. 6D and 6E.

Since the embodiment decodes signals for characters and graphics if they are transmitted through the two channels concurrently, no stand-by time is required for the operation of displaying the characters and graphics of supplementary programs if the channels switched.

While each of the above embodiments represents a television receiving set comprising two tuners, it may be understood that the present invention is applicable to a television receiving set comprising more than two tuners or other signal sources that can be selectively utilized.

Figure 8:
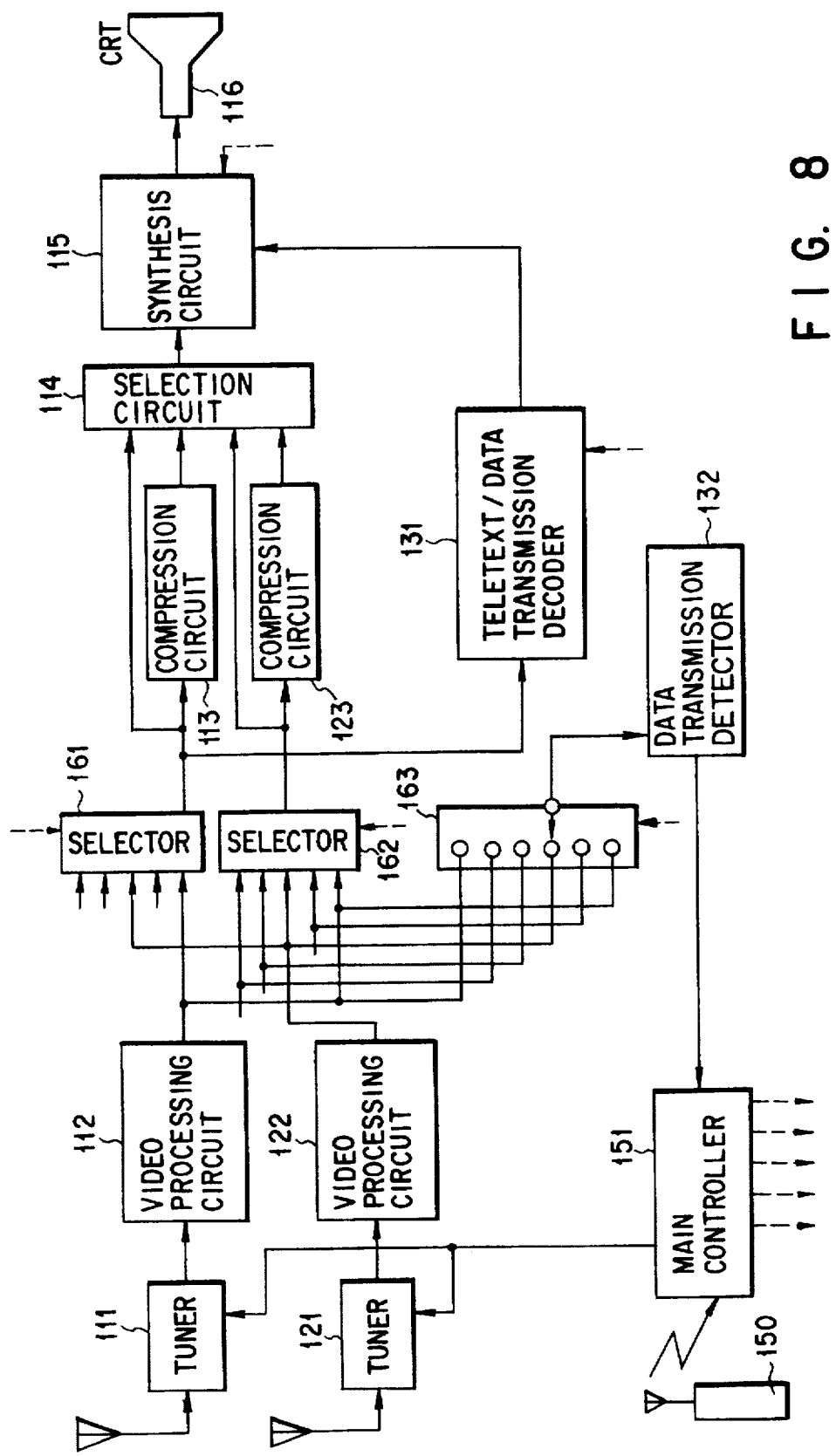
FIG. 8 is a block diagram of still another embodiment of television receiving set comprising a teletext decoder according to the invention.

FIG. 8 is a block diagram of still another embodiment of the invention comprising a teletext decoder.

This embodiment additionally comprises selectors 161 and 162, each being designed to selectively receive a signal from a plurality of signal sources. It further comprises a selector 163 which selectively receives a signal from a plurality of signal sources and feeds it to the data transmission detector 132. The selector 163 and the data transmission detector 132 periodically operate to detect any signal for data transmission contained in each input signal it receives and produces a signal representing the result of the detecting operation to the main controller 151.

This embodiment of television receiving set operates basically same as the preceding embodiments. The selectors 161 and 162 are so controlled as to display the image signal of the channel through which a teletext/data transmission is taking place always on the left side of the screen. The intermittent-line arrows indicate the electrical connection between the Main Controller and the selectors 161 & 162. If two data transmissions take place concurrently through respective channels, a mark representing a supplementary program, e.g., mark "i", is displayed on the right side section of the screen as shown in FIGS. 6D and 6E.

Therefore, with this embodiment again, the characters and graphics of supplementary programs are always displayed on a predetermined section of the screen so that the viewer can correctly recognize any supplementary program that is currently being displayed.

While the characters and graphics of supplementary programs are displayed always on the left side section of the screen of each of the embodiments in the above description, it may alternatively be so controlled that they are always displayed on the right side section of the screen.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A television receiving set comprising:

a reception circuit including a first tuner capable of receiving a first television signal and outputting a first tuned signal and a second tuner capable of simultaneously receiving a second television signal and outputting a second tuned signal;

a first processing means for processing the first tuned signal into a first video signal for display;

a second processing means for processing the second tuned signal into a second video signal for display;

display processing means for displaying the first video signal from said first processing means on either a left section or a right section of a display unit and the second video signal from said second processing means on the other section of said display unit;

a decoding means for decoding a first decoded data signal contained in said first video signal from said first processing means;

a synthesizing means for combining the data signal of the decoding means with either the first video signal or the second video signal to be displayed on a section of the screen of said display unit specified by said display processing means;

a detection means for detecting if the second video signal from said second processing means contains a second detected data signal; and a control means for controlling and changing which of the first and second tuners receive the first and second television signals when the detected output of said decoding means indicates that said first video signal does not contain any data signal and the detected output of said detection means indicates that said second video signal contains the second detected data signal, whereby the second television signal can be received through the first tuner and therefore the second data detected signal can be decoded by the decoding means.

2. A television receiving set according to claim 1, wherein said control means includes a means for maintaining the reception of the first television signal by said first tuner and maintaining the reception of the second television signal by said second tuner when the detected output of said decoding means indicates that said first video signal contains the first decoded data signal and the detected output of said detection means indicates that said second video signal also contains the second detected data signal, said television set further comprising means for synthetically combining the video signal to be displayed on said specified section of the display unit with a detection notice signal representing a predetermined mark whereby a viewer is notified that the second video signal contains the second detected data signal.

3. A television receiving set comprising:

a reception element including a first tuner capable of receiving a first television signal and outputting a first tuned signal and a second tuner capable of simultaneously receiving a second television signal and outputting a second tuned signal;

a first processing means for processing the first tuned television signal into a first video signal for display;

a second processing means for processing the second tuned television signal into a second video signal for display;

display processing means for displaying the first video signal from said first processing means on either a left section or a right section of a display unit and the second video signal from said second processing means on the other section of said display unit;

a first decoding means for decoding a first decoded data signal contained in said first video signal from said first processing means;

a second decoding means for decoding a second decoded data signal contained in said second video signal from said second processing means;

a synthesizing means for combining each of the decoded data signals of said first and second decoding means with either the first video signal or the second video signal to be displayed on a section of said display unit specified by said display processing means;

a control means for detecting if the first video signal from said first video processing means and the second video signal from said second processing means contain the first or second decoded data signal and so controlling said display processing means that, if either the first video signal contains the first decoded data signal or the second video signal contains the second decoded data signal that respective data signal and the corresponding video signal are displayed on the specified section of said display unit and the other video signal is displayed on the other section of the display unit.

4. A television receiving set according to claim 3, wherein said control means includes a means for detecting if said first video signal from said first video processing means contains the first decoded data signal and said second video signal from second video processing means contain the second decoded data signal and so controlling said display processing means that, if both of the video signals contain these data signals, one of the data signals and the corresponding video signal are displayed on the specified section of said display unit and only a predetermined mark is laid on the video signal displayed on the other section of the display unit.

5. A television receiving set comprising:

a reception element including a first tuner capable of receiving a first television signal and outputting a first tuned signal and a second tuner capable of simultaneously receiving a second television signal and outputting a second tuned signal;

a first video processing means for processing the first tuned signal received from said first tuner into a first video signal for display;

a second video processing means for processing the second tuned signal received from said second tuner into a second video signal for display;

a first selector and a second selector each for receiving a plurality of video signals including the first and second video signals supplied from the first and second video processing means and each selector being able to selectively output a first or a second selected video signal respectively;

a third selector for receiving said plurality of video signals, said third selector sequentially and selectively outputting a series of output video signals on a time divisional basis such that one video signal is output at one time;

display processing means for displaying the first selected video signal selectively output from said first selector on a first section of a display unit and for displaying the second selected video signal selectively output from said second selector on a second section of said display unit whereby said first section of the display unit is either a right or a left portion and said second section of the screen is the other of the right or left portion of the display unit;

a decoding means for decoding a data signal contained in the first selected video signal;

a synthesizing means for synthetically combining a decoded signal of the decoding means with the selected video signal which is to be displayed on the first section of said display unit;

a data information-detection means for detecting if the output signal from said third selector contains a data-information signal; and a control means for controlling said first and second selectors such that, if the data information-detection means detects that data information is included only in said first video signal of the plurality of video signals input into the third selector and that said first video signal is fed through said second selector, the control means controls the first and second selectors such that the first video signal is thereafter fed through said first selector.

6. A television receiving set according to claim 5, further comprising a mark signal synthesizing means for synthesizing a predetermined mark signal with the video signal to be displayed on the second section of the display unit if said data information-detection means detects that data information is contained in the first and second video signals which are included among the video signals selectively output from said third selector and that the first and second video signals are respectively fed from said first and second selectors.

* * * * *